Figure 1:
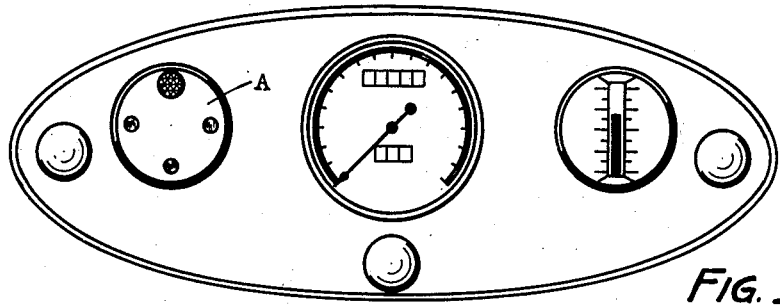

Sept. 8, 1936.  T. W. HALLERBERG  2,053,826
TELLTALE INDICATOR
Filed Oct. 2, 1933  6 Sheets-Sheet 1

INVENTOR.
Theodore W. Hallerberg.

Sept. 8, 1936.   T. W. HALLERBERG   2,053,826
TELLTALE INDICATOR
Filed Oct. 2, 1933   6 Sheets-Sheet 2
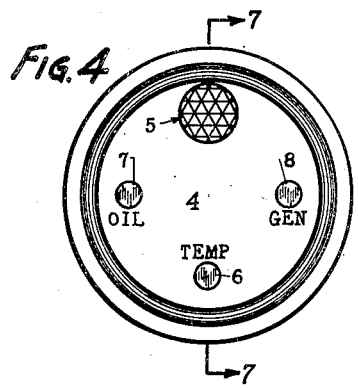
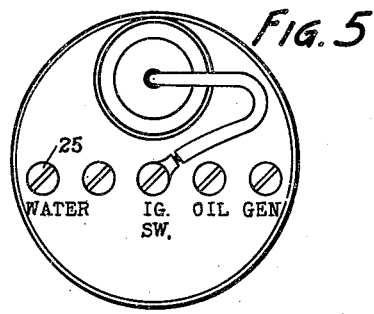
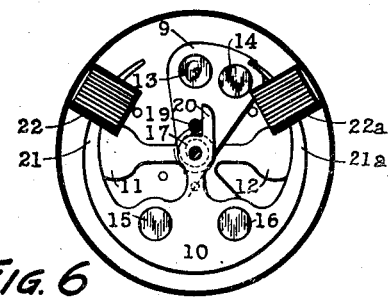
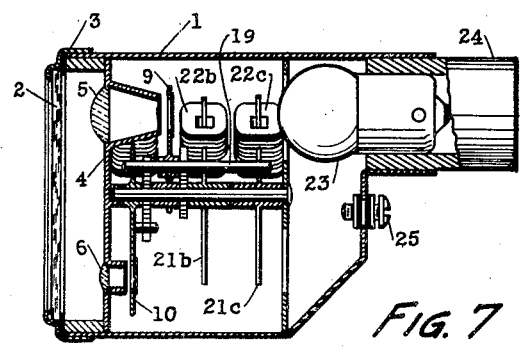
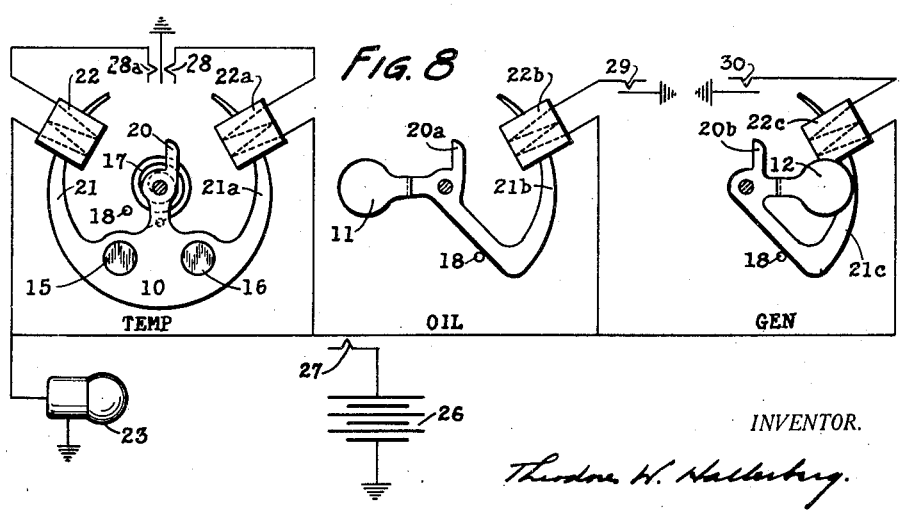
INVENTOR.
Theodore W. Hallerberg.

Sept. 8, 1936.	T. W. HALLERBERG	2,053,826
TELLTALE INDICATOR
Filed Oct. 2, 1933	6 Sheets-Sheet 3

INVENTOR.
Theodore W. Hallerberg.

Sept. 8, 1936.  T. W. HALLERBERG  2,053,826
TELLTALE INDICATOR
Filed Oct. 2, 1933  6 Sheets-Sheet 4
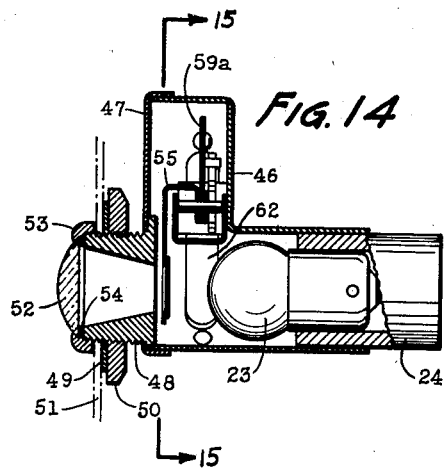
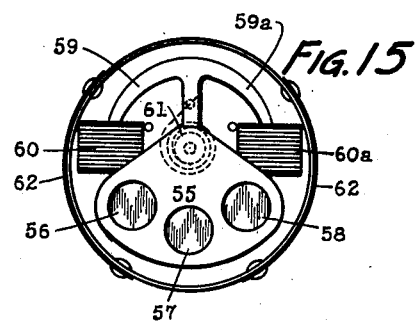
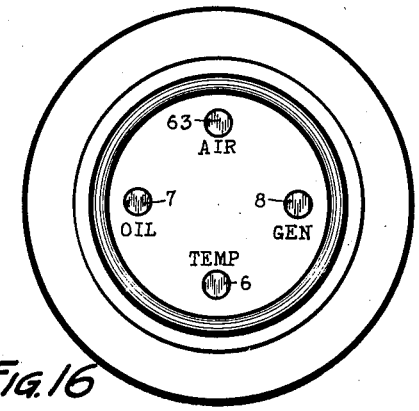
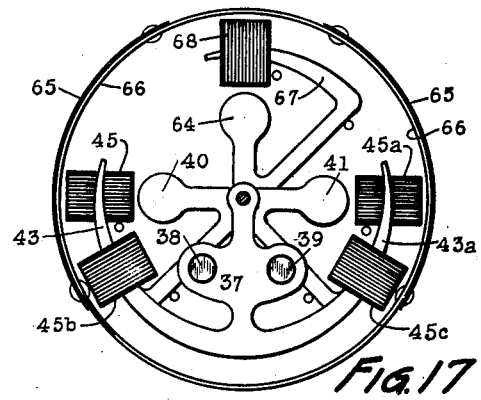
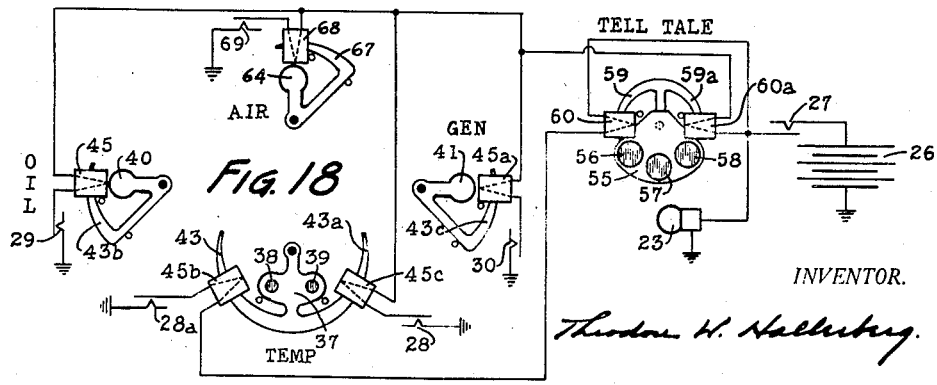
INVENTOR.
Theodore W. Hallerberg.

Sept. 8, 1936. T. W. HALLERBERG 2,053,826
TELLTALE INDICATOR
Filed Oct. 2, 1933 6 Sheets-Sheet 5
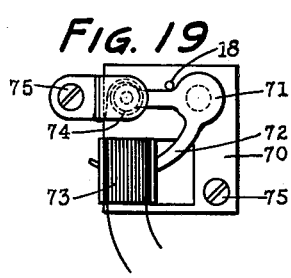
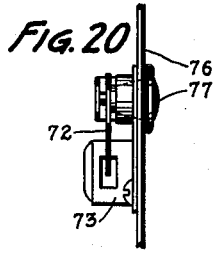
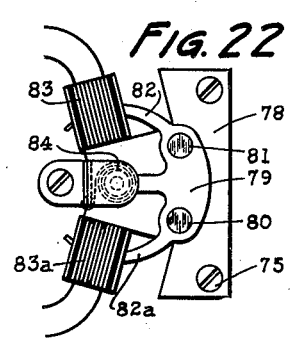
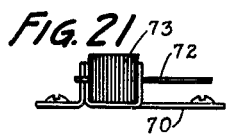
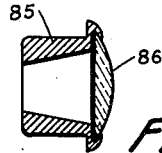
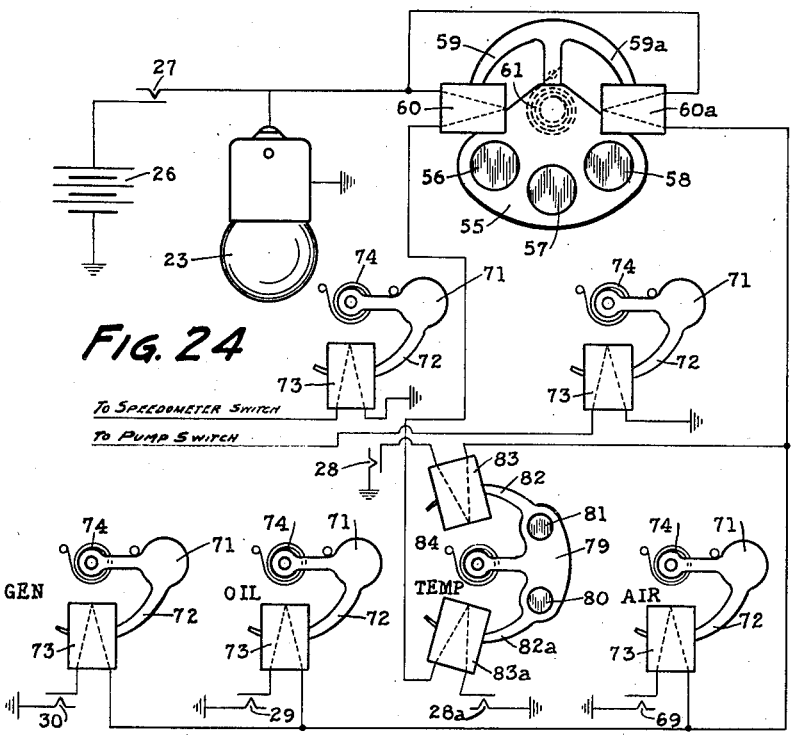
INVENTOR.
Theodore W. Hallerberg.

Sept. 8, 1936.  T. W. HALLERBERG  2,053,826
TELLTALE INDICATOR
Filed Oct. 2, 1933  6 Sheets-Sheet 6
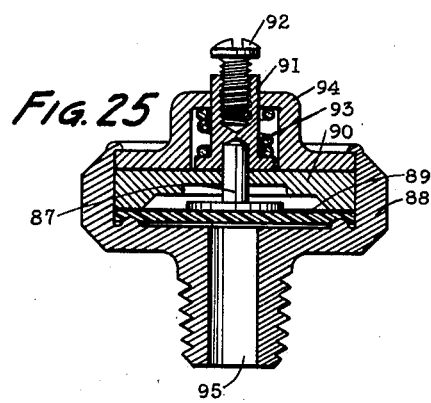
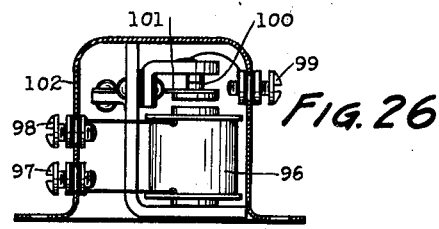
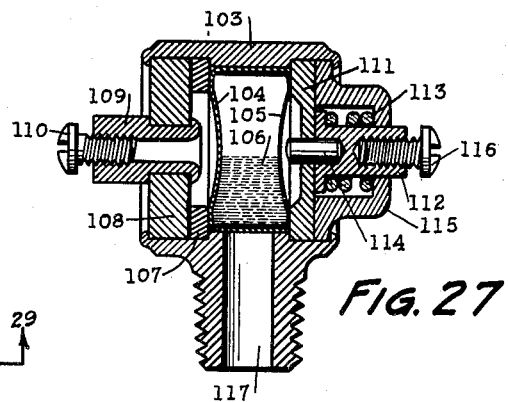
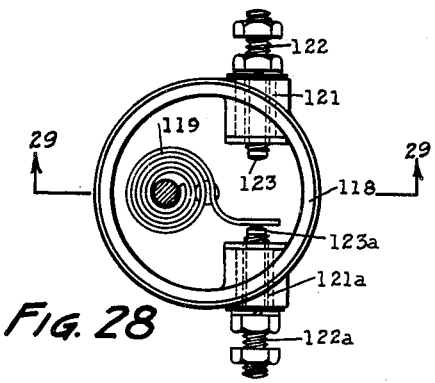
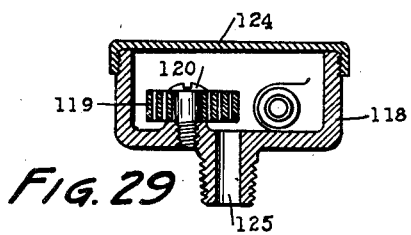
INVENTOR.
Theodore W. Hallerberg.

Patented Sept. 8, 1936

2,053,826

UNITED STATES PATENT OFFICE 2,053,826

TELLTALE INDICATOR

Theodore W. Hallerberg, Madison, Wis.

Application October 2, 1933, Serial No. 691,783

6 Claims. (Cl. 177—311)

With the increase in speed of motor vehicles and the like, it becomes dangerous for the operator to take his eyes off the road long enough to read the various pointer and dial type indicators now generally used. Therefore, the object of this invention is to provide a type of indicator which the operator will be able to read at a glance when determining whether or not the important units are functioning properly.

A further object of the invention is to reduce the indicator panel glare at night, now caused by the illumination of the many pointer and dial type indicators generally used, by providing an indicator displaying a subdued light when the important units are functioning properly and displaying a bright light when some unit ceases to function properly, thereby automatically attracting the attention of the operator when it is needed.

A further object of the invention is to provide a single telltale indicator, easily readable at a glance, informing the operator by means of colored lights of different intensities and colors whether or not all of the important units are functioning properly, and associated with the telltale indicator, source indicators normally darkened and becoming illuminated only when the corresponding unit is not functioning properly and the telltale indicator is displaying the warning signal.

A further object of the invention is to provide an indicator which will give separate indications for satisfactory and unsatisfactory operating conditions of the included units, and in case of failure of the light source it will become apparent by the absence of an indication.

A further object of the invention it to utilize the light source of the means of the invention to also illuminate adjacent instruments such as the speedometer, clock and the like.

The invention is fully described in the following specification, and while it is capable of embodiment in various forms, a suitable embodiment thereof is illustrated in the accompanying drawings, wherein:—

Figure 2:
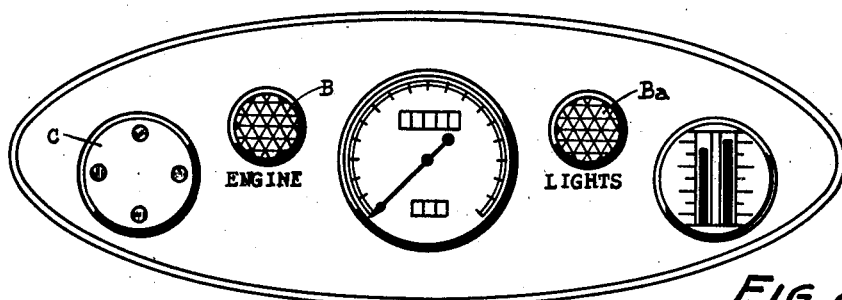
Figure 3:
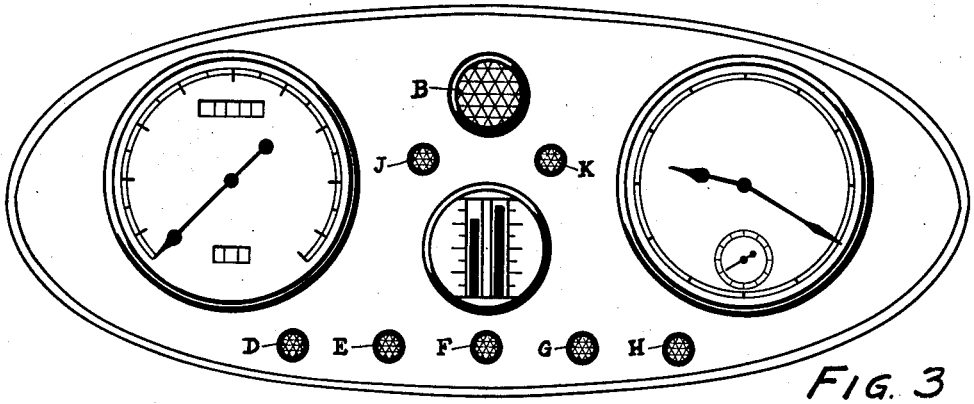

Figure 1 shows an indicator panel incorporating one form of the invention. Figure 2 shows another indicator panel incorporating a modified form of the invention with additional features thereof. Figure 3 shows a more elaborate form of indicator panel incorporating additional features of the invention.

Figures 4 to 8 show one form of the indicator illustrated in the panel assembly of Figure 1 and designated A. Figure 4 is a front view of the indicator, showing the preferred arrangement of the telltale indicator and the source indicators. Figure 5 is a rear view thereof. Figure 6 is a view directly behind the face of the indicator, showing the arrangement of the component parts. Figure 7 is a sectional view of the indicator taken about the vertical center line 7—7 of Figure 4. Figure 8 is a wiring diagram of the indicator shown in Figures 4 to 7.

Figure 9:
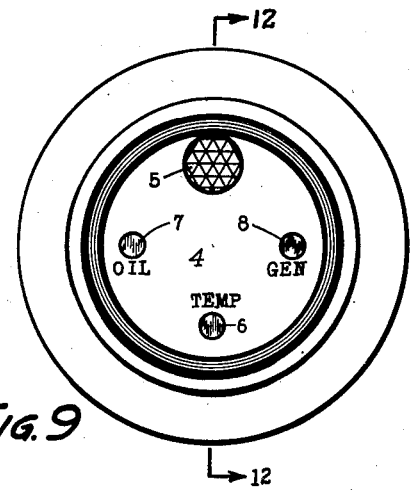
Figure 10:
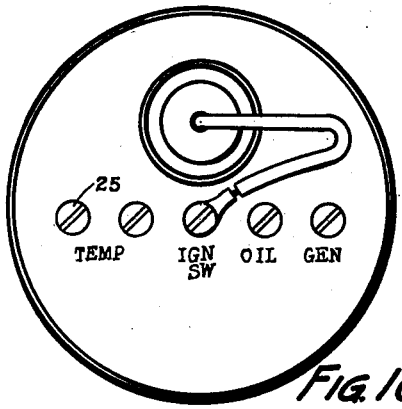
Figure 11:
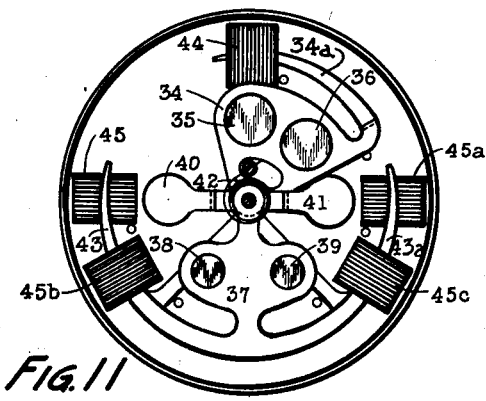
Figure 12:
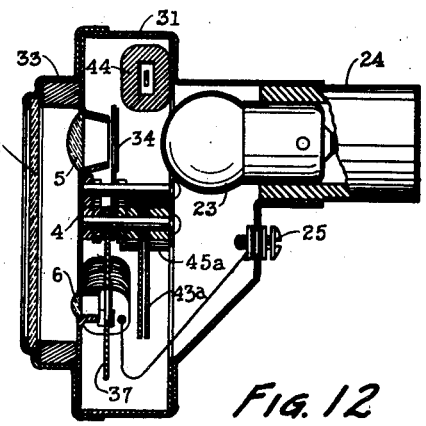
Figure 13:
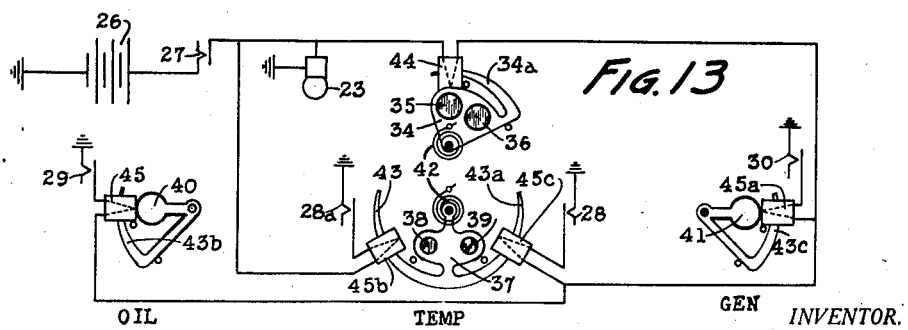

Figures 9 to 13 show a modified form of the indicator shown in Figures 4 to 8. Figure 9 is a front view of the indicator, and is similar to Figure 4. Figure 10 is a rear view thereof. Figure 11 is a view directly behind the face of the indicator, showing the arrangement of the component parts. Figure 12 is a sectional view of the indicator taken about the vertical center line 12—12 of Figure 9. Figure 13 is a wiring diagram of the indicator shown in Figures 9 to 12.

Figures 14 to 18 show the indicators used in the panel assembly of Figure 2. Figure 14 is a sectional view of the telltale indicator taken about its vertical center line. Figure 15 is a view on line 15—15 of Figure 14. Figure 16 is a front view of the source indicator showing the preferred arrangement of the different indicators. Figure 17 is a view directly behind the face of the source indicator showing the arrangement of the component parts. Figure 18 is a wiring diagram of the telltale indicator and the source indicator shown in Figures 14 to 17.

Figures 19 to 24 show the individual source indicators used in the panel assembly of Figure 3. Figure 19 is a rear view of the light intercepter assembly. Figure 20 is a side view thereof. Figure 21 is a bottom view of Figure 19. Figure 22 is a rear view of the semaphore assembly. Figure 23 is a sectional view of the lens assembly. Figure 24 is a wiring diagram of the telltale indicator and source indicators shown in the panel assembly of Figure 3.

Figures 25 to 29 show the various electrical switches used in conjunction with the indicators. Figure 25 is a sectional view of the fluid pressure controlled switch which may be operated by the engine oil pressure or the compressed air pressure. Figure 26 is a part sectional view of the generator relay switch which may be operated by the flow of current generated by the generator. Figure 27 is a sectional view of one form of engine temperature switch, in this case controlled by the expansion and contraction of a volatile fluid. Figure 28 is a modified form of engine temperature switch, in this case controlled by the expansion and contraction of a thermostatic metal or bimetal spiral. Figure 29 is a sectional view of Figure 28 taken about the center line 29—29 of Figure 28.

Although the source indicators are marked Oil, Generator and the like, in various views in order to facilitate reading the drawings and wiring diagrams, I wish it understood that the indicators are not limited to the units so indicated.

In Figure 1 the means of the invention is shown to the left and designated A. This indicator is shown in detail in Figures 4 to 13. The telltale indicator designated B in Figure 2, and the source indicator designated C are shown in detail in Figures 14 to 18. The telltale indicator for the lighting circuits designated Ba is described in my "Electric lighting circuit monitor" application Serial No. 596,827. The telltale indicator designated B in Figure 3 is identical to the indicator B of Figure 2. The source indicators designated D, E, F, and G are shown in detail in Figures 19 to 23, also in the wiring diagram of Figure 24. Indicator designated H has preferably a clear lens and in this case may be connected with the lighting circuits as described in my application Serial No. 596,827. Indicator designated J has preferably a yellow lens and in this case may be connected with the centralized lubricating system and operated by a switch in the speedometer. Indicator designated K has preferably a green lens and in this case may be connected with the pumping unit of the centralized lubricating system. The indicators J and K are also shown in the wiring diagram of Figure 24 and are shown in the form of lamps in the wiring diagram of Figure 1 in my application Serial No. 579,639.

Indicator designated D in Figure 3 has preferably a red lens and in this case may be connected with the generator. Indicator designated E has preferably a red lens and in this case may be connected with the engine oil line. Indicator designated F has preferably a clear lens and in this case may be connected with the engine temperature switch. Indicator designated G has preferably a red lens and in this case may be connected with the compressed air supply. The telltale indicator B is electrically connected with the source indicators D, E, F, and G as shown in the wiring diagram of Figure 24.

Referring to Figures 4 to 8, the indicator shown comprises a body 1, to the front side of which a cover glass 2 is held in place by the retainer 3. Behind the cover glass is the face 4 into which four lenses are inserted; the telltale lens 5 and the lower source indicator lens 6 are preferably of clear glass while the lenses 7 and 8 are preferably red. Behind the face of the indicator are two semaphores 9 and 10, also two light intercepters 11 and 12. The semaphore 9 has two color filters inserted therein, filter 13 being preferably green while filter 14 is preferably red. Semaphore 10 also has two color filters inserted therein, filter 15 being preferably red while filter 16 is preferably yellow. A spiral spring 17 urges the semaphore 9 to the position shown in Figure 6. Various stops 18 are provided to limit the travel of the semaphores and light intercepters. A long pin 19 securely fastened to the semaphore 9 coacts with the arms 20, 20a, and 20b. Arcuate armatures 21, 21a, 21b, and 21c form part of the semaphore 10 and light intercepters 11 and 12 and pass through the solenoids 22, 22a, 22b, and 22c respectively. A lamp 23 is placed behind the semaphores and light intercepters, preferably in line with the telltale lens 5. The lamp socket 24 is removable in order to permit replacement of the lamp when necessary. Terminal screws 25 are provided for connecting the outside wiring to the indicator.

All green color filters are preferably of a subdued green shade enabling them to display a subdued green light at their corresponding lens while all red filters are preferably of a bright red enabling them to display a bright red light at their corresponding lens.

In the wiring diagram Figure 8, a source of electrical current is shown in the form of a battery 26. Current passes to the instrument, rendering it operative whenever the switch 27 is closed. The ignition switch may be used advantageously in place of the switch designated 27. The temperature switch has two separate contactors designated 28 and 28a, fluid pressure switch 29 and generator relay switch 30 together with the temperature switch are described in detail elsewhere.

In Figures 9 to 13 I have shown a modified form of the indicator shown in Figures 4 to 8. The modified form of indicator comprises a body 31, with the front cover glass 32 held in place by the retainer 33. The front of the face 4 shown in Figure 9 is identical to that of Figure 4. Behind the face 4 are two semaphores 34 and 37, also two light intercepters 40 and 41. The semaphore 34 has two color filters inserted therein, filter 35 being preferably green while filter 36 is preferably red. The semaphore 37 also has two color filters inserted therein, the filter 38 being preferably red while the filter 39 is preferably yellow. Spiral springs 42 urge the semaphores to the positions shown in Figure 11. Arcuate armatures 34a, 43, 43a, 43b, and 43c are part of the semaphores 34 and 37 and light intercepters 40 and 41 and pass through the solenoids 44, 45, 45a, 45b, and 45c respectively.

The telltale indicator shown in Figures 14 and 15 comprises a body 46, also a cover 47 into which is securely fastened the lens body 48 threaded as shown and provided with a lock washer 49 and a nut 50 for fastening the indicator to the panel 51 shown by dotted lines. To the front of the lens body 48 is the lens 52, preferably of clear glass, securely held in place by the threaded retainer 53. A washer 54 is interposed between the lens 52 and the lens body 48. Behind the lens body 48 and inside the indicator body 46 is the semaphore 55 into which three color filters are inserted; filter 56 being preferably yellow and filter 57 being preferably green while filter 58 is preferably red. The double arcuate armatures 59 and 59a are attached to the semaphore 55 and pass through the solenoids 60 and 60a. A spiral spring 61 urges the semaphore 55 to the central position shown in Figure 15. A lamp 23 is placed behind the semaphore preferably in line with lens 52. The lamp socket 24 is removable in order to permit replacement of the lamp when necessary. Light openings 62 are provided in order to permit the lamp 23 to also illuminate the adjacent instruments. Solenoid 60a is preferably of greater magnetic strength than solenoid 60.

The source indicator shown in Figures 16 and 17 is similar in construction to the indicator shown in Figures 9 to 12 with the exception that a red lens 63 is used in place of the tell-tale lens 5 and a light intercepter 64 is used in place of the semaphore 34. Transparent covers 65 are placed over the openings 66 in order to permit rays of light from the lamp 23 to illuminate the adjacent indicators. Arcuate armature 67 is a portion of the light intercepter 64 and passes through the solenoid 68. In the wiring diagram of Figure 18, the fluid pressure operated switch 69 may be connected with the compressed air supply.

The source indicators used in the panel assembly of Figure 3 are shown in detail in Figures 19 to 24. The light intercepter shown in Figures 19 to 21 comprises a base 70 to which the light intercepter 71 is pivotally mounted. The arcuate armature 72 is part of the intercepter 71 and passes through the solenoid 73. A spiral spring 74 urges the intercepter to the position shown in Figure 19. Screws 75 are provided for fastening the assembly to the indicator panel 76. Inserted from the front side of the panel are the lens assemblies 77.

Figure 22 shows a semaphore assembly comprising a base 78 to which the semaphore 79 is pivotally mounted. Into the semaphore are inserted two color filters; filter 80 being preferably red while filter 81 is preferably yellow. Arcuate armatures 82 and 82a are part of the semaphore and pass through the solenoids 83 and 83a. A spiral spring 84 urges the semaphore to the central position shown in Figure 22.

Figure 23 shows an enlarged sectional view of the lens assembly which is inserted from the front side of the indicator panel. The assembly comprises a body 85 into which the lens 86 is securely fastened. The lenses may be of different colors, some being green, yellow or red while others may be preferably clear.

The fluid pressure controlled switch shown in Figure 25 and designated 29 and 69 in the wiring diagrams comprises a body 88 threaded at the lower end and recessed at the upper end as shown. Into the recess is inserted a flexible diaphragm 89 above which is the stationary contact element 90 fitted tightly into the body 88. The movable contact element 91 is threaded at the upper end to receive the terminal screw 92. A spring 93 urges the movable contact element 91 towards the stationary contact element 90. A stud 87 is inserted through the hole in the stationary contact element, and is preferably made of fibre or other non-conducting material. The cover 94 is also preferably made of fibre or other non-conducting material. The passage 95 permits the fluid under pressure to exert pressure against the diaphragm 89. Movement of the diaphragm is transmitted through the stud 87 to the movable contact element 91. The switch is normally electrically closed as shown in Figure 25. Current passes from the lead-in wire to the terminal 92, to the movable contact element 91, to the stationary contact element 90, to the switch body 88 which is grounded. As soon as the fluid pressure reaches a predetermined amount, diaphragm 89 bulges upward raising the stud 87 and the movable contact element 91, thereby breaking the electrical contact. As soon as the fluid pressure falls below the predetermined amount, spring 93 again moves the movable contact element downward against the stationary contact element 90 thereby electrically closing the switch.

The generator relay switch shown in Figure 26 and designated 30 in the wiring diagrams, may be attached to the generator or other grounded unit. It comprises a solenoid 96 with the ends of the windings attached to the terminals 97 and 98. The terminal 97 may be wired to the generator while the terminal 98 is wired to the battery. Terminal 99 is wired to the associated indicator, and also wired to the stationary contact element which is electrically insulated from the switch assembly. The spring urged movable contact element 101 is in contact with the switch assembly which is grounded, and normally assumes the position shown in Figure 26, thereby grounding the current entering through the terminal 99. Current generated by the generator passes through the solenoid 96, energizing it, thereby drawing the movable contact member 101 towards it, breaking the electrical contact at 100. When the generator ceases charging, the solenoid 96 will become deenergized, permitting the movable contact member 101 to raise, thereby electrically closing the contacts at 100 and again grounding the current entering through the terminal 99.

The volatile fluid controlled engine temperature switch shown in Figure 27 and designated 28 in the wiring diagrams may be screwed into the engine cylinder block or cylinder head. The switch comprises a body 103, preferably made of aluminum, threaded at the lower end and recessed as shown. Two cups 104 and 105 made preferably of spring bronze, are fitted together and hermetically sealed with the volatile fluid 106 therein. The cup 104 is preferably made of heavier material than the cup 105. To the left of cup 104 is a spacer washer 107. The washer 108 securely fastened to the body 103 is preferably fibre or other non-conducting material, and has the stationary contact member 109 securely fastened thereto. The terminal 110 is threaded into the stationary contact member as shown. To the right of cup 105 is the stationary contact member 111. The movable contact member 112 is threaded to receive the terminal screw 116 and is urged towards the stationary contact member by the spring 113. Pin 114 is loosely fitted through the hole in the stationary member 111. The cover 115 is preferably made of fibre or other non-conducting material. The passage 117 is for air passage only and serves no definite purpose.

The switch is normally closed to terminal 116 and open to terminal 110 as shown. As the volatile fluid 106 expands due to the absorption of heat, it first bulges the thin cup 105, exerting pressure on pin 114 and moving the movable contact member 112 away from the stationary contact member 111 breaks the electrical contact. Further expansion of the volatile fluid due to the absorption of additional heat, bulges the heavier cup 104, thereby making electrical contact between it and the stationary contact member 109. As the volatile fluid contracts during cooling, cup 104 will first return to normal position, thereby breaking the electrical contact with the stationary contact member 109. Further cooling and contraction of the volatile fluid will permit the cup 105 to return to normal position, thereby again making electrical contact between members 111 and 112.

The thermostatic metal, or bimetal controlled engine temperature switch shown in Figures 28 and 29 and designated 28 in the wiring diagrams, serves the same purpose as switch shown in Figure 27. Either type of switch may be used to accomplish the desired effect. In this switch, the body 118, preferably made of aluminum, is threaded at the lower end and recessed at the upper end as shown. A spiral 119 of thermostatic metal, or bimetal, is securely held at its center by the screw 120, permitting the outer end to move with the expansion and contraction due to heat absorption. Into the body 118 are threaded two studs 122 and 122a, which are electrically insulated from the body by the collars 7

121 and 121a which are preferably made of fibre or other non-conducting material. The ends of the studs 122 and 122a serve as stationary contactors 123 and 123a. The outer end of the spiral 119 serves as the movable contactor. The cover 124 is screwed to the body 118 and provides accessibility for inspection and adjustment. The passage 125 is for air passage only and serves no definite purpose.

The switch is normally electrically closed to terminal stud 122a and open to terminal stud 122. As the spiral 119 tends to straighten out due to the heat absorption, contact is first broken between the spiral 119 and stud 123a, further movement of the spiral due to the absorption of additional heat, causes contact to be made between the spiral 119 and the stud 123. Upon contraction of the spiral 119 contact is first broken at stud 123; upon additional contraction, contact is again made at stud 123a. Temperature range adjustment is provided by loosening the screw 120 and setting the spiral to the desired position, also by screwing the terminal studs 122 and 122a in or out as desired.

The engine temperature switches are so constructed to permit adjustment as to preferably allow for a normal operating temperature range of from approximately one-hundred to two-hundred degrees Fahrenheit. Below this range, contacts would be electrically closed grounding terminals 116 or 122a; above this range, contacts would be closed grounding terminals 110 or 122, whereas within the range the switches would be electrically open.

In operation, the instrument shown in Figures 4 to 8 is wired as shown in the wiring diagram of Figure 8, and is rendered operative whenever the switch 27 is closed. It is desirable to use the ignition switch for the switch 27. The electrical current flows from the battery 26 through switch 27, through lamp 23 which is grounded. With the switch 27 closed and the engine not running, there would be no oil pressure and the generator would not be generating current, in which case the telltale indicator 5 would display a bright red light, the source indicators 7 and 8 would also display a red light, and, if the engine temperature be below the normal operating range, the source indicator 6 would display a yellow light. With the engine running, with sufficient oil pressure and the generator generating current, the telltale 5 would display a subdued green light while the source indicators 7 and 8 would be darkened. Source indicator 6 would continue to display a yellow light until the engine temperature reaches the normal operating range, when it also would become darkened. It is apparent that with the switch 27 closed and the engine not started, the operator is able to check the indicator in order to determine whether or not it is functioning properly. Under normal operating conditions with the included units functioning properly, the telltale indicator will display a subdued green light which the operator is able to read at a glance, thereby informing him that all of the included units are functioning properly.

As soon as the oil pressure becomes too low, or the generator ceases generating current, or the engine temperature raises to above the normal operating range, the telltale indicator 5 will immediately change from displaying a subdued green light to displaying a bright red light, thereby automatically attracting the attention of the operator when it is needed. One or more of the source indicators 6, 7, or 8 would also display a red light informing the operator which unit it is, that is not functioning properly.

Referring to the wiring diagram of Figure 8 it is apparent that solenoids 22, 22a, 22b, and 22c are connected to the source of current when the switch 27 is closed. Lamp 23 also connected to the source of current when the switch 27 is closed, becomes illuminated, due to its being grounded. Under normal operating conditions, with the included units functioning properly, switches 28, 28a, 29, and 30 are electrically open, and the semaphores 9 and 10 and light intercepters 11 and 12 assume the positions shown in Figure 6.

Under normal operating conditions, but with the engine temperature below the normal operating range, switch 28a is electrically closed completing the circuit through the solenoid 22, energizing the solenoid, thereby moving the armature 21 and the semaphore 10 in a clock-wise direction until it rests against one of the stops 18, thereby positioning the yellow filter 16 in line with the clear lens 6, permitting the light rays from lamp 23 to pass through filter 16 to lens 6 causing lens 6 to display a yellow light. During this movement of semaphore 10, the arm 20 recedes from the pin 19, thereby not affecting the position of the semaphore 9. As soon as the engine temperature reaches the normal operating range, contact at switch 28a is again broken permitting the semaphore 10 to return to the central position shown in Figure 8, thereby darkening lens 6.

When, under operating conditions, the engine temperature rises to beyond the normal operating range, the switch 28 becomes electrically closed completing the circuit through the solenoid 22a, energizing the solenoid, thereby moving the armature 21a and the semaphore 10 in a counter-clockwise direction, positioning the red filter 15 in line with the clear lens 6, permitting the light rays from lamp 23 to pass through filter 15 to lens 6, causing lens 6 to display a red light. During this movement of semaphore 10, the arm 20 moves pin 19 and semaphore 9 to the left, positioning the green filter 13 out of register with the telltale lens 5 and the red filter 14 in register with the lens 5, changing the color displayed by the telltale lens 5 from a subdued green to a bright red. As soon as the engine temperature falls to within the normal operating range, switch 28 will again break contact, permitting the semaphores 9 and 10 to return to the positions shown in Figure 6.

Under operating conditions, with the proper engine oil pressure, the switch 29 will be electrically open and the light intercepter 11 would assume the position shown in Figure 6, thereby preventing the light rays of lamp 23 from reaching the lens 7. As soon as the oil pressure falls below the predetermined amount, the contact at switch 29 would become electrically closed completing the circuit through the solenoid 22b, energizing the solenoid, thereby moving the armature 21b and the light intercepter 11 in a counter clockwise direction, permitting the light rays from the lamp 23 to illuminate the lens 7. During this movement of the light intercepter 11, the arm 20a moves pin 19 and semaphore 9 to the left, positioning the green filter 13 out of register with the telltale lens 5 and the red filter 14 in register with the lens 5, changing the color displayed by the telltale lens 5 from a subdued green to a bright red. As soon as the engine oil pressure again reaches the normal range, contact at switch 29 is again broken permitting the semaphore 9 and the light intercepter 11 to return to the positions shown in Figure 6, causing the telltale lens 5 to again display a subdued green light and darkening the lens 7.

The operation of the indicator 8 is identical to that of indicator 7, with the exception that the circuit is controlled by the switch 30.

In the modified form of indicator shown in Figures 9 to 13, the telltale semaphore 34 is actuated magnetically, whereas in the indicator shown in Figures 4 to 8 the semaphore 9 was actuated mechanically. Referring to the wiring diagram of Figure 13 it is apparent that the current passing through the solenoids 45, 45a, and 45c must necessarily first pass through the solenoid 44. Current passing through solenoid 45b does not pass through the solenoid 44. Under normal operating conditions, current passes from the battery 26 through the switch 27 to the lamp 23 which is grounded; if the included units be functioning properly, but the engine temperature be below the normal operating range, switch 28a will be electrically closed completing the circuit through the solenoid 45b, energizing the solenoid, thereby moving the armature 43 and the semaphore 37 in a clockwise direction, positioning the yellow filter 39 in line with the lens 6, permitting the light rays from the lamp 23 to pass through the filter 39 to lens 6, causing lens 6 to display a yellow light. This operation in no way affects the semaphore 34. In the event one or more of the switches 28, 29 or 30 be closed, the current will flow from the battery 26 through the switch 27, through the solenoid 44, through one or more of the solenoids 45, 45a or 45c, through one or more of the closed switches 28, 29 or 30 which are grounded. In so doing the semaphore 34 would move to the left from the position shown in Figure 11, thereby changing the light displayed by the telltale lens 5 from a subdued green to a bright red; one or more of the light intercepters 40 and 41 and semaphore 37 would also change its position, thereby indicating red at the corresponding indicator 6, 7 or 8, depending upon the corresponding switch or switches that be closed.

Referring to the wiring diagram of Figure 18, it is apparent that the current passing through the solenoids 45, 45a, 45c, and 68 must necessarily first pass through the solenoid 60a, whereas the current passing through the solenoid 45b must necessarily first pass through the solenoid 60. Under normal operating conditions, current passes from the battery 26 through the switch 27 to the lamps 23 which are grounded; if the included units be functioning properly, but the engine temperature be below the normal operating range, switch 28a will be electrically closed completing the circuit through the solenoids 60 and 45b, energizing the solenoids, thereby moving the armature 59 and the semaphore 55 in a counter clockwise direction, positioning the yellow filter 56 in line with the lens 52 shown in Figure 14, permitting the light rays from the lamp 23 to pass through the filter 56 onto lens 52, causing lens 52 to display a yellow light armature 43 and semaphore 37 are also moved, but in a clockwise direction, positioning the yellow filter 39 in line with the lens 6 of Figure 16, causing lens 6 to also display a yellow light. In the event that one or more of the switches 29, 30 or 69 be closed while switch 28a is still closed, the solenoid 60a being of greater magnetic strength than solenoid 60, would overcome the pull of solenoid 60 thereby moving the armature 59a and semaphore 55 in a clockwise direction, positioning the red filter 58 in line with the lens 52 of Figure 14, causing the lens 52 to display a red light while the lens 6 would continue to display yellow; one or more of the lenses 7, 8 or 63 would also display red, depending upon the switch or switches closed. Under normal operating conditions, and with the engine temperature within the normal operating range, the semaphore 55 would assume the position shown in Figure 15 while the light intercepters 40, 41, and 67 and semaphore 37 would assume the position shown in Figure 17, causing a subdued green light to be displayed at telltale indicator B of Figure 2 while the four source indicators of C, Figure 2, would be darkened. As soon as one or more of the included units ceases to function properly, the telltale indicator B would display a bright red light, also one or more of the source indicators of C would display a red light, depending upon the unit or units not functioning properly.

The operation of the indicators shown in the panel assembly of Figure 3 is similar to that of Figure 2, with the exception that the indicators D, E, F, and G replace the source indicator unit C. The indicator unit B of Figure 3 is identical to the indicator unit B of Figure 2.

It is apparent that I have provided a single telltale indicator, easily readable at a glance, informing the operator by means of colored lights of different intensities whether or not a plurality of associated units are functioning properly, and have associated with the single telltale indicator, source indicators normally darkened and becoming illuminated only when the corresponding unit is not functioning properly and the single telltale indicator is displaying the warning signal, thereby automatically attracting the attention of the operator when it is needed.

Obviously the specific relative arrangement of parts shown and described may be changed and varied to adapt the same for various installations and uses, depending upon the type of vehicle, airplane or other unit the indicator is installed upon and the associated units the proper functioning of which it is desirable to have an indication, without departing from the scope of the invention as indicated by the appended claims.

Having thus described my invention, what I claim is:

1. In an indicating system, a source of electrical supply, a telltale lamp connected to said supply, a semaphore having a plurality of different colored lenses adapted to register with said telltale lamp, a plurality of solenoids connected in separate parallel sub-circuits to said supply, separate means to complete each of said sub-circuits, means associated with each of said solenoids to give a visual indication of the presence or absence of current flow in the respective sub-circuit by altering the visual effect of said telltale lamp, and means to move said semaphore to a predetermined position whenever any one of certain of said sub-circuits is closed.

2. In an indicating system, a source of electrical supply, a telltale lamp connected to said supply, a semaphore having a plurality of different colored lenses adapted to register with said telltale lamp, a plurality of solenoids connected in separate parallel sub-circuits to said supply, separate means to complete each of said sub-circuits, means associated with each of said solenoids to give a visual indication of the presence or absence of current flow in the respective sub-circuit by altering the visual effect of said telltale lamp, one of said means being common to two of said solenoids, said means being influenced by both so as to stand in one position when one solenoid is energized and in another position when the other solenoid is energized, and means to move said semaphore to a predetermined position whenever any one of certain of said sub-circuits is closed.

3. In an indicating system, a source of electrical supply, a telltale lamp connected to said supply, a pivotally mounted semaphore having a plurality of different colored lenses adapted to register with said telltale lamp, a plurality of solenoids connected in separate parallel circuits to said supply, separate means to complete each of parallel circuits, armatures associated with each solenoid and movable thereby, means carried by each armature to give a visual indication of the presence or absence of current flow in each of said parallel sub-circuits by changing the visual effect of said telltale light, a pin carried by said semaphore and an extension carried by each armature adapted to strike and move said pin and rotate said semaphore whenever any one of certain of said solenoids is energized whereby said semaphore is caused to assume a predetermined position and present a different colored lens to said telltale light.

4. In an indicating system, a source of electrical supply, a telltale lamp connected to said supply, a main circuit having an indicator solenoid therein, an armature normally standing in one position and movable by said solenoid to another predetermined position, a semaphore actuated by said armature and having a plurality of different colored lenses adapted to register with said telltale lamp, a plurality of solenoids connected in parallel sub-circuits with said main circuit and in series with said indicator solenoid, separate means to complete each of said sub-circuits, means including an armature associated with the solenoid in each of said sub-circuits to give a visual indication of the presence or absence of current flow in the respective sub-circuit by altering the visual effect of said telltale lamp, and a circuit in parallel with said main circuit having a solenoid and a switch in series, said last named solenoid being associated with an armature common to one of the solenoids of said parallel sub-circuits.

5. In an indicating system, a source of electrical supply, a telltale lamp connected to said supply, a magnetically operated indicator having a pair of coils connected in parallel to said supply and a common armature influenced by the relative current flow in said coils and biased to stand in a predetermined position when the current flow in both said coils is normal, movable to another predetermined position when the current flow in one of said coils is greater than normal and to another predetermined position when the current flow in the other coils is greater than normal, a semaphore carried by said armature and having a plurality of different colored lenses adapted to register with said telltale lamp in each of said predetermined armature positions, a plurality of solenoids connected in separate parallel sub-circuits and in series with one of the coils of said telltale indicator, separate means to complete each of said parallel circuits to cause current to flow through the respective solenoids, a solenoid in series with the second of the coils of said indicator, means to complete the circuit through said last named solenoid, and means including armatures associated with each of said solenoids to give a visual indication of the presence or absence of current flow in each of said parallel sub-circuits by altering the visual effect of said telltale lamp.

6. In an indicating system, a source of electrical supply, a telltale lamp connected to said supply, a magnetically operated indicator having a pair of coils connected in parallel to said supply and a common armature influenced by the relative current flow in said coils and biased to stand in a predetermined position when the current flow in both said coils is normal, movable to another predetermined position when the current flow in one of said coils is greater than normal and to another predetermined position when the current flow in the other coil is greater than normal, a semaphore carried by said armature and having a plurality of different colored lenses adapted to register with said telltale lamp in each of said predetermined armature positions, a plurality of solenoids connected in separate parallel sub-circuits and in series with one of the coils of said telltale indicator, separate means to complete each of said parallel circuits to cause current to flow through the respective solenoids, a solenoid in series with the second of the coils of said indicator, means to complete the circuit through said last named solenoid, and means including armatures associated with each of said solenoids to give a visual indication of the presence or absence of current flow in each of said parallel sub-circuits by altering the visual effect of said telltale lamp, one of said last named means including an armature common to two of said solenoids and influenced by both so as to stand in one position when one solenoid is energized and in another position when the other solenoid is energized.

THEODORE W. HALLERBERG.